United States Patent
Kuroda

(10) Patent No.: US 7,227,824 B2
(45) Date of Patent: *Jun. 5, 2007

(54) INFORMATION REPRODUCING APPARATUS, METHOD OF CORRECTING REPRODUCING PROGRAM, AND INFORMATION RECORDING MEDIUM

(75) Inventor: Kazuo Kuroda, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 512 days.

This patent is subject to a terminal disclaimer.

(21) Appl. No.: 10/166,727

(22) Filed: Jun. 12, 2002

(65) Prior Publication Data

US 2003/0002411 A1 Jan. 2, 2003

(30) Foreign Application Priority Data

Jun. 14, 2001 (JP) .......................... P2001-180695

(51) Int. Cl.
*G11B 20/18* (2006.01)

(52) U.S. Cl. ............................... 369/53.35; 369/30.21; 369/59.25; 714/769

(58) Field of Classification Search ............. 369/30.05, 369/30.07, 30.22, 53.21, 53.31, 53.35, 47.17, 369/47.21, 47.31, 59.23, 59.24, 59.25; 714/770; 711/112

See application file for complete search history.

(56) References Cited

U.S. PATENT DOCUMENTS

| | | | | |
|---|---|---|---|---|
| 5,608,910 A | | 3/1997 | Shimakura | .................. 395/670 |
| 5,715,355 A | * | 2/1998 | Yonemitsu et al. | ............ 386/95 |
| 5,796,913 A | * | 8/1998 | Takada et al. | ............... 386/125 |
| 5,808,987 A | * | 9/1998 | Oda et al. | ................... 369/47.2 |
| 6,288,990 B1 | * | 9/2001 | Fujiie et al. | ............. 369/47.21 |
| 6,463,153 B1 | * | 10/2002 | Sako et al. | .................. 380/201 |
| 6,557,166 B2 | * | 4/2003 | Shinohara et al. | .......... 717/124 |
| 2001/0044933 A1 | | 11/2001 | Tagiri et al. | ................... 717/11 |
| 2003/0037286 A1 | | 2/2003 | Kuroda | |

FOREIGN PATENT DOCUMENTS

| | | |
|---|---|---|
| CN | 1288232 A | 3/2001 |
| EP | 0 507 397 A2 | 10/1992 |
| EP | 1 083 748 A2 | 3/2001 |
| JP | 3-273424 | 12/1991 |
| JP | 04-299728 | 10/1992 |
| JP | 05225683 | 9/1993 |
| JP | 7-85638 | 3/1995 |
| JP | 07-085638 | 3/1995 |
| JP | 07085638 | 3/1995 |
| JP | 07-248914 | 9/1995 |
| JP | 11-045496 | 2/1999 |

\* cited by examiner

*Primary Examiner*—Thang V. Tran
(74) *Attorney, Agent, or Firm*—Drinker Biddle & Reath LLP

(57) ABSTRACT

An information reproducing apparatus, in which a disk having correction data recorded thereon is placed, acquires region information indicative of a region corresponding to the correction data after load processing is performed by a ROM loader. Then, under the control of a CPU, the apparatus determines the correction data to be used for correcting a reproducing program based on the region information, reads the correction data from a lead out area or its outer region on the disk, temporarily retains the read correction data in a first RAM or a second RAM, and then stores the correction data to be resident in a nonvolatile first flash memory or a second flash memory, to correct the reproducing program based on the correction data. The information reproducing apparatus thereafter reproduces user data recorded on the disk according to the corrected reproducing program.

16 Claims, 6 Drawing Sheets

FIG. 5

| CORRECTION DATA TABLE |
|---|
| COMPANY NAME |
| PRODUCT ID NO |
| CORRECTION DATA VERSION |
| CORRESPONDING REGION |
| CORRECTION DATA START ADDRESS |
| CORRECTION DATA SIZE |
| RESERVED |
| |

INFORMATION REPRODUCING APPARATUS, METHOD OF CORRECTING REPRODUCING PROGRAM, AND INFORMATION RECORDING MEDIUM

BACKGROUND OF THE INVENTION

1. Field of the Invention

The present invention relates generally to an information recording medium such as an optical disk on which various content objects are already recorded and an information reproducing apparatus that reproduces such content objects from the information recording medium. More particularly, the invention is directed to a method of correcting a reproducing program executed by the information reproducing apparatus using correction data recorded on the information recording medium.

2. Description of Related Art

Prior-art optical disk players that play an optical disk such as a DVD on which various content objects are already recorded sometimes encounter, after shipped from factories, trouble caused by bugs in their playing program. A user facing such trouble when trying to play a DVD on his or her optical disk player contacts the maker of the optical disk player to have the player troubleshooted so that the maker will take effective measures to fix the trouble. It usually takes a considerable time before the optical disk player is fixed, to both the user's and maker's disadvantage, probably more to the maker's disadvantage in that the maker has to accommodate similar complaints from many users spending its time and money. In addition, trouble likely to be encountered by these optical disk players tends to become increasingly complicated due to differences in content data, incompatibility among various specifications and standards, and problems associated with authoring tools, etc., to such an extent that a drastic measure seems difficult.

Under such circumstances, JP-A-7-85638 proposes one solution to eliminate trouble such as mentioned above. In this solution, patch data for the playing program is produced, then an optical disk is distributed, on which the generated patch data is recorded in its predetermined area so that an optical disk player reads the recorded patch data to correct its playing program. This solution permits the optical disk player to automatically correct its playing program upon placing of the optical disk in the optical disk player.

However, in view of the fact that such trouble is often caused due to optical disk players being available in a diversity of models, it is necessary to prepare a plurality of types of correction data compatible with different models of optical disk players. Therefore, it is desirable that the plurality of types of correction data are recorded on an optical disk. To record the plurality of types of correction data on an optical disk, a sizable area needs to be reserved on the optical disk. However, the data size usable in a lead-in area is so limited that it is difficult to record the plurality of types of correction data to such an extent as to take care of trouble associated with a diversity of playing programs.

SUMMARY OF THE INVENTION

The invention has been made to satisfy the above need. It is, therefore, an object of the invention to provide an information reproducing apparatus, a method of correcting a reproducing program, and an information recording medium which upon occurrence of trouble in the reproducing program, are capable of correcting the reproducing program quickly and properly based on a plurality of types of correction data corresponding to different reproducing programs which are dependent upon different models, etc. of information reproducing apparatuses.

The above object of the present invention can be achieved by an information reproducing apparatus of the present invention that corrects a reproducing program using correction data recorded on an information recording medium to reproduce record information recorded on the information recording medium. The apparatus is provided with: a correction control device for reading the correction data to be used to correct the reproducing program, from the information recording medium on which the correction data is recorded in a lead out area, to correct the reproducing program based on the read correction data; and a reproduction control device for reproducing the record information recorded on the information recording medium according to a latest version of the reproducing program which is corrected by the correction control device.

According to this invention, if the information reproducing apparatus encounters trouble associated with the reproducing program when reproducing the record information recorded on the information recording medium, the information reproducing apparatus reads the correction data from the lead out area of the information recording medium to correct the reproducing program using the read correction data, so that the information reproducing apparatus can thereafter reproduce the information recording medium using the latest version of the reproducing program. Thus, for trouble associated with the reproducing program to be executed by the information reproducing apparatus, the maker of the information reproducing apparatus no longer needs to recall its product to reduce its cost and time that would otherwise be incurred for fixing the trouble. The user can also stop worrying about correction to his or her advantage. In addition, the correction data is recorded in the lead out area in which a larger size can be reserved therefor than in the lead in area where various control information is usually recorded, so that various types of correction data can be used to properly correct different reproducing programs dependent upon different information reproducing apparatuses.

The above object of the present invention can be achieved by an information reproducing apparatus of the present invention that corrects a reproducing program using correction data recorded on an information recording medium to reproduce record information recorded on the information recording medium. The apparatus is provided with: a correction control device for reading the correction data to be used to correct the reproducing program, from the information recording medium on which the correction data is recorded in an area radially outward of a lead out area, to correct the reproducing program based on the read correction data; and a reproduction control device for reproducing the record information recorded on the information recording medium according to a latest version of the reproducing program which is corrected by the correction control device.

According to this invention, the reproducing program can be corrected using the correction data recorded in an area radially outward of the lead out area, in a similar configuration to the above invention. Thus, various types of correction data can be used to properly correct different reproducing programs dependent upon different information reproducing apparatuses in accordance with operations and advantages common to the above invention.

In one aspect of the present invention, the information reproducing apparatus is further provided with a nonvolatile storage device for storing the correction data, wherein the correction control device records the correction data in a predetermined location of the storage device, and the reproduction control device executes a corrected version of the reproducing program after confirmation that the correction data is recorded normally.

According to this aspect, upon locating the correction data on the information recording medium, the information reproducing apparatus records the correction data at a predetermined position of the nonvolatile storage device, and executes the corrected version of the reproducing program after confirmation that the correction data is normally recorded. Thus, once the reproducing program is corrected based on the correction data, the information reproducing apparatus allows the corrected version of the reproducing program to reside in the nonvolatile storage device, and hence the information reproducing apparatus can automatically execute the corrected version of the reproducing program thereafter without involving any complicated control.

In another aspect of the present invention, the correction control device records a start position of the correction data as a start position address, and the reproduction control device executes the corrected version of the reproducing program by searching the start position address.

According to this aspect, when recording the correction data in the nonvolatile storage device, the information reproducing apparatus records a start position address corresponding to the head of the correction data, to use the recorded start position address for execution of the corrected version of the reproducing program. Thus, the position where the correction data is recorded can be accurately located, to allow the reproducing program to be executed reliably.

In further aspect of the present invention, while the correction data is recorded in the storage device, an operation of turning off power is prohibited.

According to this aspect, the information reproducing apparatus is prohibited from being turned off during the recording of the located correction data in the nonvolatile storage device. This arrangement thus prevents destruction of the corresponding type of correction data due to inadvertent turning off of the power of the information reproducing apparatus.

In further aspect of the present invention, the correction data is provided with difference data between an original version of the reproducing program and a corrected version of the reproducing program, and the correction control device corrects the reproducing program based on the original version of the reproducing program and the difference data.

According to this aspect, once the information reproducing apparatus locates the correction data on the information recording medium, a corrected version of the reproducing program can be obtained from the correction data given as difference data and the original version of the reproducing program. Thus, the size of the correction data can be reduced, to leave the size of user data unreduced.

The above object of the present invention can be achieved by a method of the present invention of correcting a reproducing program using correction data recorded on an information recording medium. The method is provided with: the process of reading the correction data to be used to correct the reproducing program, from the information recording medium on which the correction data is recorded in a lead out area; and the process of correcting the reproducing program based on the read correction data.

According to this aspect, the reproducing program requiring measures to eliminate trouble can be corrected based on the correction data, by similar operations to the above invention. Thus, various types of correction data can be used to properly correct different reproducing programs dependent upon different information reproducing apparatuses.

The above object of the present invention can be achieved by a method of the present invention of correcting a reproducing program using correction data recorded on an information recording medium. The method is provided with: the process of reading correction data to be used to correct the reproducing program, from the information recording medium on which the correction data is recorded in an area radially outward of a lead out area; and the process of correcting the reproducing program based on the read correction data.

According to this invention, the reproducing program requiring measures to eliminate trouble can be corrected based on the correction data, by similar operations to the above invention. Thus, various types of correction data can be used to property correct different reproducing programs dependent upon different information reproducing apparatuses.

In one aspect of the present invention, the method is provided with: the process of recording the correction data at a predetermined position of a nonvolatile storage device; and the process of recording a start position of the correction data as a start position address.

According to this aspect, the correction data is allowed to reside in the nonvolatile storage device for subsequent effective use without involving any complicated control, by similar operations to the above invention.

In another aspect of the present invention, the correction data is provided with difference data between an original version of the reproducing program and a corrected version of the reproducing program, and the reproducing program is corrected based on the original version of the reproducing program and the difference data.

According to this aspect, the size of the correction data as the difference data can be reduced, by similar operations to the above invention.

The above object of the present invention can be achieved by an information recording medium of the present invention on which recorded information as well as correction data for correcting a reproducing program executed by an information reproducing apparatus are recorded, wherein the correction data is recorded in a lead out area.

According to this invention, the correction data are recorded in the lead out area of the information recording medium to correct the reproducing program by using the correction data as mentioned above. Thus, different reproducing programs can be corrected as the information recording medium encounters such different reproducing programs when put on a general distribution channel, to both the user's and maker's advantage.

The above object of the present invention can be achieved by an information recording medium on which recorded information as well as correction data for correcting a reproducing program executed by an information reproducing apparatus are recorded, wherein the correction data is recorded in an area radially outward of a lead out area.

According to this invention, the correction data are recorded in an area radially outward of the lead out area of the information recording medium to correct the reproducing program by using the correction data as mentioned above. Thus, different reproducing programs can be corrected as the information recording medium encounters such different reproducing programs when put on a general distribution channel, to both the user's and maker's advantage.

In one aspect of the present invention, the correction data is recorded in a recording format different from a recording format in which the recorded information is recorded.

According to this aspect, the user data and the correction data are recorded on the information recording medium in different data formats, respectively. This arrangement thus prevents any third party from abusing the correction data by making it hard to analyze the correction data or by encrypting the correction data, for example.

In another aspect of the present invention, the correction data each comprises difference data between an original version of the reproducing program and a corrected version of the reproducing program.

According to this invention, the correction data are recorded in the form of difference data which is small in size, by similar operations to the above invention. Thus, an information recording medium having an unreduced user data storage area can be provided.

BRIEF DESCRIPTION OF THE DRAWINGS

FIG. 5 is a diagram showing the structure of a correction data table read in step S22 of FIG. 4.

DETAILED DESCRIPTION OF THE PREFERRED EMBODIMENT

A preferred embodiment of the invention will now be described with reference to the drawings. The preferred embodiment refers to the case where the invention is applied to an optical disk player as an information reproducing apparatus that plays an information recording medium on which data are already recorded.

Figure 1:
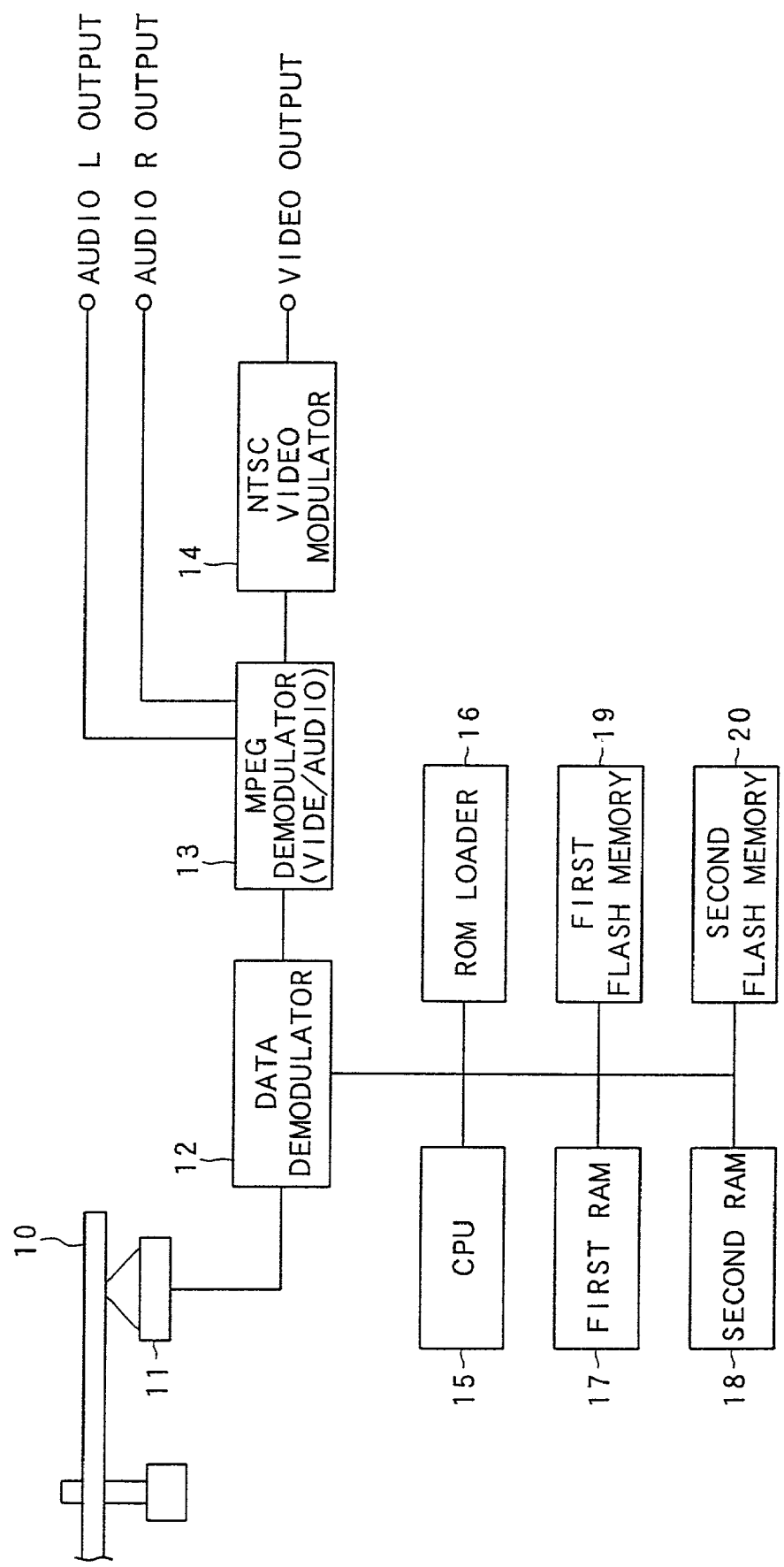
FIG. 1 is a block diagram showing major parts of an optical disk player as an information reproducing apparatus to which the invention is applied.

Referring to FIG. 1, the optical disk player, in which a ROM disk 10 as a read-only information recording medium is placed to play user data corresponding to content, is generally provided with a pickup 11, a data demodulator 12, an MPEG demodulator 13, an NTSC video modulator 14, a CPU 15, a ROM loader 16, a first RAM 17, a second RAM 18, a first flash memory 19, and a second flash memory 20.

Figure 2:
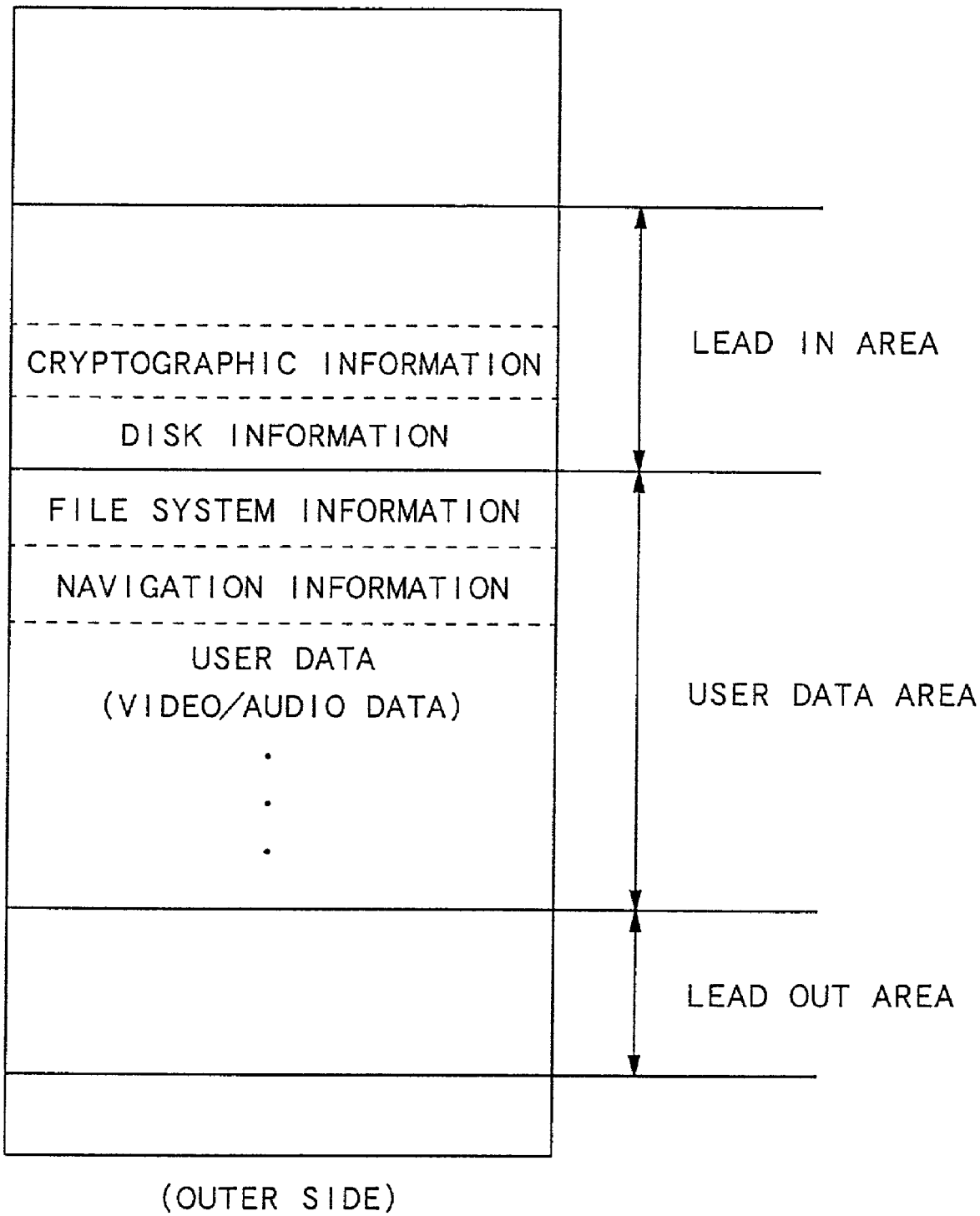
FIG. 2 is a diagram schematically showing the data structure of a disk placed in the optical disk player.

Referring then to FIG. 2, the data structure of the disk 10 placed in the optical disk player will be described. The disk 10 is marketed with data already recorded thereon, the data being MPEG or similarly coded data corresponding to content such as, for example, films. As shown in FIG. 2, the disk 10 has three recording areas, i.e., a lead-in area, a user data area, and a lead-out area laid out from the inner toward the outer side.

The lead-in area includes cryptographic information used to encrypt the content for copyright protection, and disk information indicative of the physical characteristics of the disk 10. The user data area includes file system information indicative of the data structure for recording the content by conversion into files, navigation information used to display menus and sequences necessary for playback control, and user data such as video/audio data corresponding to the body of the content already recorded at the factory. The lead-out area defines the end of the data recorded on the disk 10.

On the disk 10 according to this embodiment, the correction data necessary for correcting a playing program in the optical disk player is already recorded. Specifically, in order to take care of trouble associated with the optical disk player in playing a specific content object, correction data are embedded in the disk 10 in a manner usable by the optical disk player. While the correction data may be embedded in any of the lead-in area, user data area, lead-out area and outer region of the lead-out area, the following description refers to the case of embedding the correction data in the lead-out area or its outer region. How the playing program is corrected using the correction data by the optical disk player will be described below.

Referring back to FIG. 1, the pickup 11 irradiates a recording track of the rotating disk 10 with an optical beam through optics, and also receives reflected light from the information recorded surface of the disk 10 to output photoelectrically converted read signals.

The data demodulator 12 subjects the received read signals from the pickup 11 to signal processing including waveform shaping, demodulation, and analog-to-digital conversion, to output digital signals corresponding to the content. The demodulator 12 also outputs the above-mentioned correction data, which is required to correct the playing program as will be described below.

The MPEG demodulator 13 demodulates the digital signals demodulated by the data demodulator 12, in a manner compatible with an MPEG format to separately generate video and audio data outputs corresponding to the content. The video data output is fed to the NTSC video modulator 14 to generate an NTSC-compatible video output for an external device. The audio data, which is generated as stereophonic L/R signals, is also output to an external device.

The CPU 15 performs general control over the operations of the optical disk player shown in FIG. 1. The CPU 15 is coupled to various memory means and the ROM loader 16 via a data bus. The memory means usable by the CPU 15 are the first and second RAMs 17 and 18 for temporarily retaining data, and the first and second flash memories 19 and 20 as nonvolatile memories. The CPU 15 serves as a correction control device and a reproduction control device of the invention in cooperation with other components.

The ROM loader 16 performs load processing under the control of the CPU 15 prior to playing the disk 10 loaded in the optical disk player. At the playing start, the ROM loader 16 loads, to the first or second RAM 17 or 18, the playing program to be finally stored in the first or second flash memory 19 or 20.

The first and second RAMs 17 and 18 are volatile memory devices used by the CPU 15 for its control processing, and temporarily retain the playing program, which needs to be loaded every time the optical disk player is turned on. In contrast, the first and second flash memories 19 and 20 are nonvolatile memory devices used to make resident therein the playing program temporarily retained in the first and second RAMs. Thus, even when the optical disk player is tuned off or even when the data in the first and second RAMs 17 and 18 are deleted, the playing program can be retained in the first and second flash memories 19 and 20.

It should be appreciated that a dual configuration comprising a pair of RAM-flash memory systems is proposed in this embodiment in order to implement correction of the playing program. Briefly, while the memory device in one of the pair of RAM-flash memory systems is executing the playing program, the memory device in the other system stores a corrected version of the playing program, which is corrected using the correction data recorded on the disk 10. This configuration will be described in more detail below.

Figure 3:
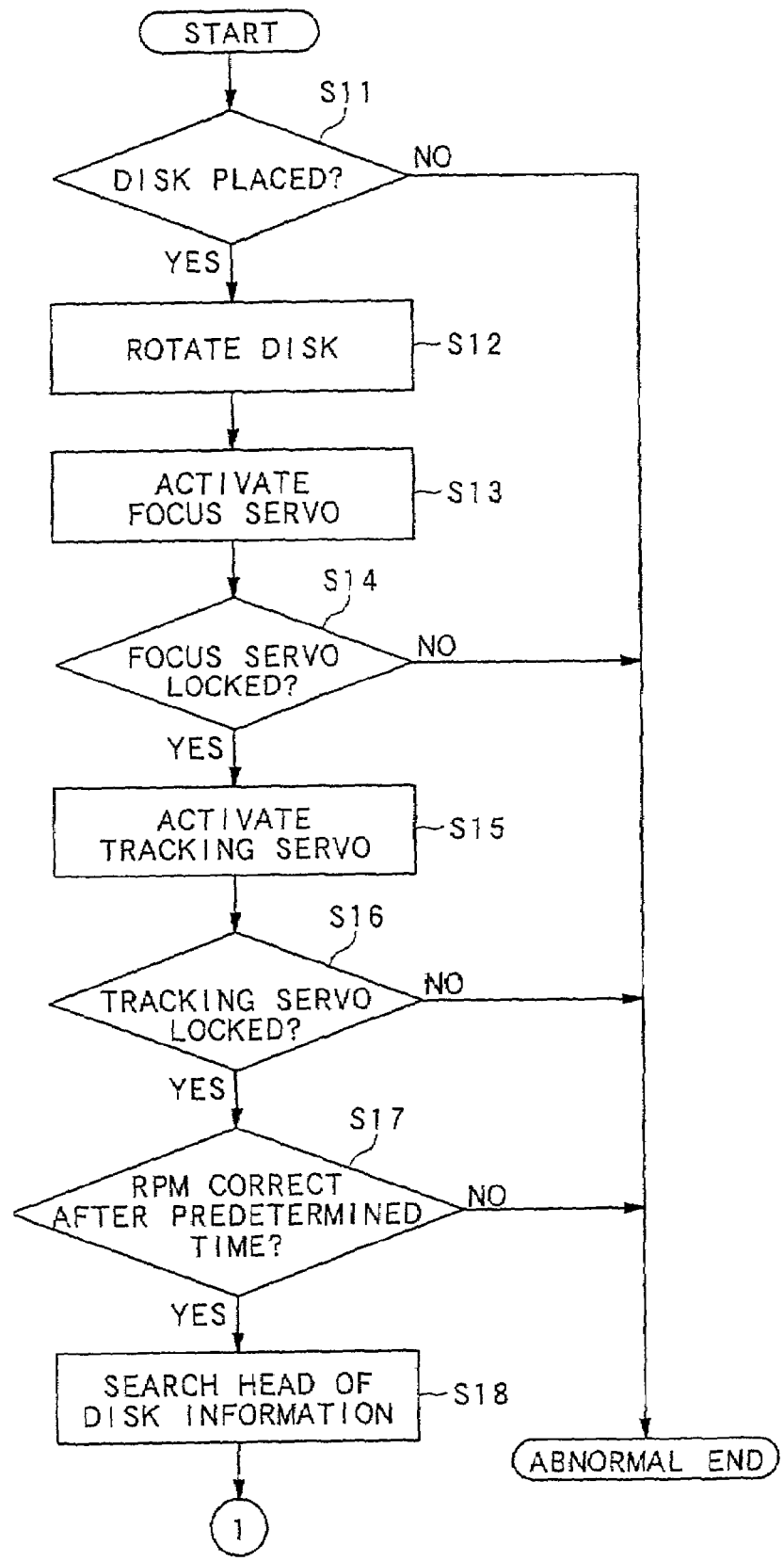
FIG. 3 is a first flowchart showing a process of correcting a playing program, performed by the optical disk player.
Figure 4:
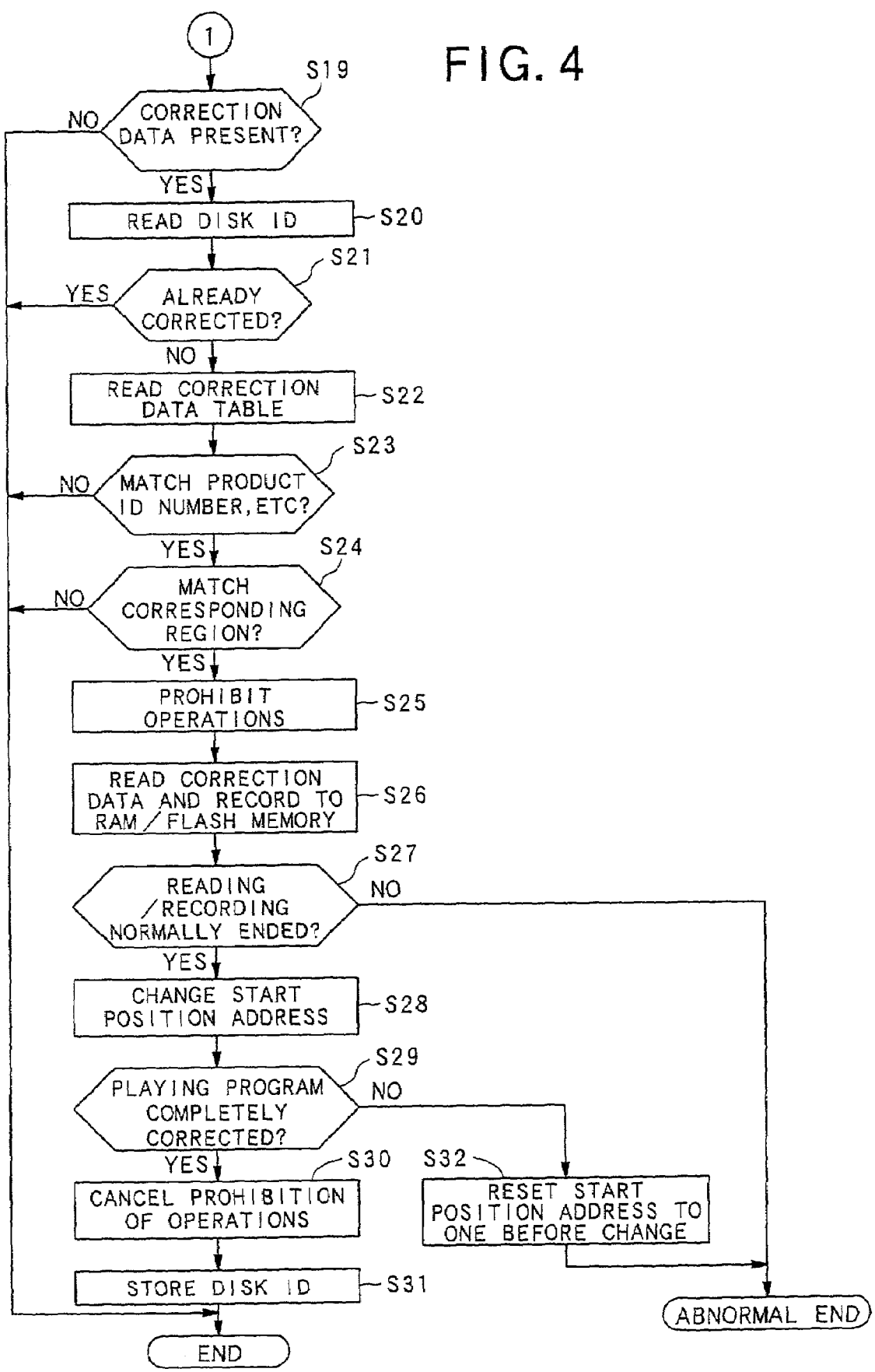
FIG. 4 is a second flowchart showing the process of correcting the playing program, performed by the optical disk player.

Referring next to FIGS. 3 and 4, a process of correcting the playing program, performed by the optical disk player according to this embodiment will be described. The process shown in FIG. 3 starts when the optical disk player is turned on. First, whether or not the disk 10 is placed in the optical disk player is determined (step S11). If so ("YES" in step S11), the disk 10 is driven to rotate (step S12).

Then, a focus servo is activated (step S13). Upon confirmation that the focus servo loop is closed to be locked ("YES" in step S14), a tracking servo is then activated (step S15). Successively, upon confirmation that the tracking servo loop is closed to be locked ("YES" in step S16), the rpm of the disk 10 is checked (step S17). If the rpm has reached a predetermined value after a predetermined time has elapsed ("YES" in step S17), then the head of the disk information is searched in order to read various information recorded in the lead in area of the disk 10 (step S18).

If it is not confirmed that the focus servo is locked ("NO" in step S14), if it is not confirmed that the tracking servo is locked ("NO" in step S16), or the rpm has not reached the predetermined value after the predetermined time has elapsed ("NO" in step S17), the process of FIG. 3 proceeds to an abnormal end routine.

Referring next to FIG. 4, if it is determined that the disk 10 has correction data based on information read in step S18 ("YES" in step S19), then a disk ID as an identifier contained in the disk information is read from the lead in area (step S20). Otherwise ("NO" in step S19), the process of FIG. 4 is brought to an end.

Successively, if it is determined that the playing program in the optical disk player has never been corrected by a type of correction data corresponding to the disk 10 based on the disk ID read in step S20 ("NO" in step S21), then the start address of a correction data table located in a predetermined area of the disk 10 is searched to read the correction data table (step S22). If, on the other hand, the playing program has been corrected by the corresponding type of correction data ("YES" in step S21), then the process of FIG. 4 is brought to an end.

Referring here to FIG. 5, the correction data table contains, as information relevant to the type of correction data corresponding to the disk 10 to be read in step S22, a company name, a product ID No., a correction data version, a corresponding region, a correction data start address, and a correction data size. Thus, based on the correction data table, information unique to the disk 10 and information relevant to the type of correction data corresponding to the disk 10 can be identified. It should be noted that the correction data table contains as many correction data start addresses, correction data sizes, etc. as a plurality of types of correction data which are recorded to fix trouble dependent upon different models, etc. of optical disk players.

In this embodiment, the company name, product ID No. and correction data version contained in the correction data table are compared with the company name, product ID No. and playing program version stored in the optical disk player to make a first determination as to whether or not correction is necessary (step S23). If these items of information in the optical disk player do not match the equivalents on the disk 10 ("NO" in step S23) so that no correction is necessary, the process of FIG. 4 is terminated immediately. If the first determination indicates that correction is necessary ("YES" in step S23), then the "corresponding region" contained in the correction data table of the disk 10 is compared with regional information about where the optical disk player is sold which is stored in the optical disk player to make a second determination as to whether or not correction is necessary (step S24). Specifically, the "region" corresponding to the corresponding type of correction data, not "region" corresponding to a specific content object on the disk 10 itself, serves as the basis for determining necessity of correction in terms of "regional aspects" of the playing program to be corrected. The "corresponding region" corresponding to the corresponding type of correction data on the disk 10 helps determine necessity of correction in order to eliminate trouble associated with factors suggestive of region such as the model of a particular maker and the language of a particular country, for example. This multi-stage determination configuration narrows the aspects of the trouble to be fixed by correction down to the "region" specified by the "corresponding region" in order to obviate wasteful correction.

If the regional aspect of the optical disk player does not match the corresponding region through the second determination ("NO" in step S24), then the process of FIG. 4 is immediately terminated. Otherwise ("YES" in step S24), various operations such as turning off the optical disk player and giving user commands are prohibited (step S25). Successively, the corresponding correction data is read from the lead out area or its outer region on the disk 10, and the read correction data is recorded in the second RAM 18 and the second flash memory 20 (step S26). The prohibition of various operations in step S25 is to prevent abnormality from occurring during the reading and recording of the correction data in step S26.

In step S26, the correction data start address and correction data size contained in the correction data table are read, and the start address is then searched to read a predetermined size of the corresponding type of correction data. Thereafter, the corresponding type of correction data which has been read is developed in both the volatile second RAM 18 and the nonvolatile second flash memory 20.

It is desirable here that the correction data according to this embodiment be recorded on the disk 10 in a format different from that of the user data. If the correction data were recorded using the same format as that of the user data, the correction data could be easily read, analyzed, copied, and distributed. In order to prevent the correction data-recorded disk 10 from being delivered to any willful third party, it is required that a recording format different from typical recording formats be used in recording the correction data to keep anyone from accessing the correction data. The correction data may alternatively be encrypted upon recording on the disk 10.

The correction data according to this embodiment can be embedded as watermarks in the video and audio data corresponding to the user data. For example, it may be effective to embed correction data for fixing trouble associated with a particular one of a plurality of content objects, in the video and audio data of any of the content objects other than that particular content object as a watermark. This technique permits such correction data to be read during the playing of the watermarked content object based on the watermark to correct the playing program. This technique, which would make it harder for anyone to locate correction data by embedding the correction data in user data which is large in size, is effective in protecting correction data.

The correction data according to this embodiment may be used to directly record a corrected playing program, i.e., replacing an entire original playing program with a corrected playing program, or record only difference data between an original playing program and a corrected playing program. In the difference data approach, the corrected playing program needs to be generated using both the difference data indicated by the correction data and the original playing program. The difference data approach is more advantageous over the entire recording approach in reducing the size of the correction data.

Next, if it is determined that the reading and recording have been completed normally in step S26 ("YES" in step S27), a start position address is changed (step S28). The start position address is given to indicate the head of a playing program corresponding to the corresponding type of correction data, and recorded in a predetermined area of the first flash memory 19 or the second flash memory 20, for example. Thus, by referring to the start position address changed in step S28, the start position for executing the playing program corrected by the corresponding type of correction data can be located.

Alternatively, a flag indicating that the recording has been performed normally may be appended to the start of the playing program corresponding to the corresponding type of correction data, instead of changing the start position address in step S28. In this case, the flag should be detected to locate the start position for executing the corrected playing program.

Successively, if the playing program has been corrected normally by the above process ("YES" in step S29), then the prohibition of the various operations in step S25 is cancelled (step S30), so that the optical disk player will be ready to accept the operations such as turning off the power and giving user commands. Additionally, the disk ID is stored in a memory within the CPU 15 so that the above correcting process will not be repeated on the disk 10 (step S31). In this way, the process of FIGS. 3 and 4 are brought to a normal end.

If, on the other hand, the reading and recording have not been completed normally in step S26 ("NO" in step S27), then the process branches to the abnormal end routine. If the playing program has not been corrected normally ("NO" in step S29), the process resets the start position address to the last address before the change in step S28 (step S32), and then proceeds to the abnormal end routine.

When the process of FIGS. 3 and 4 have been terminated normally, the corrected playing program is recorded in the second RAM 18 and the second flash memory 20. From then on, the optical disk player continuously plays the disk 10 using the corrected playing program stored in the volatile second RAM 18. Furthermore, once the optical disk player is turned off, the user can load the corrected playing program resident in the nonvolatile second flash memory 20 using the ROM loader 16 to play the disk 10. To further correct the corrected playing program under this condition, another corresponding type of correction data needs to be recorded in the first flash memory 19 in step S26 since the previously used type of correction data is resident in the second flash memory 20. That is, in the above process, every time the playing program is corrected, the latest corrected version of the playing program is stored alternately in the first flash memory 19 and the second flash memory 20 to be resident therein.

It should also be appreciated that even if any abnormality, such as sudden interruption of power during the reading of the corresponding type of correction data in step S26, has occurred to cause failure in normal reading, this will create no problem in the next playback. In this case, the start position address will not be changed in step S28 so that the disk 10 can be played normally using the original playing program recorded in one of the pair of RAM-flash memory systems.

Here, the location where the correction data is recorded on the disk 10 according to this embodiment will be described. As mentioned above, it is assumed in this embodiment that the correction data is to be recorded in the lead out area or its outer region on the disk 10. For example, in a DVD format, the innermost and outermost radii of the lead out area following the user data area are specified, and the lead out area can be identified by referring to a "last recorded address" which is recorded in the lead in area.

Figure 6:
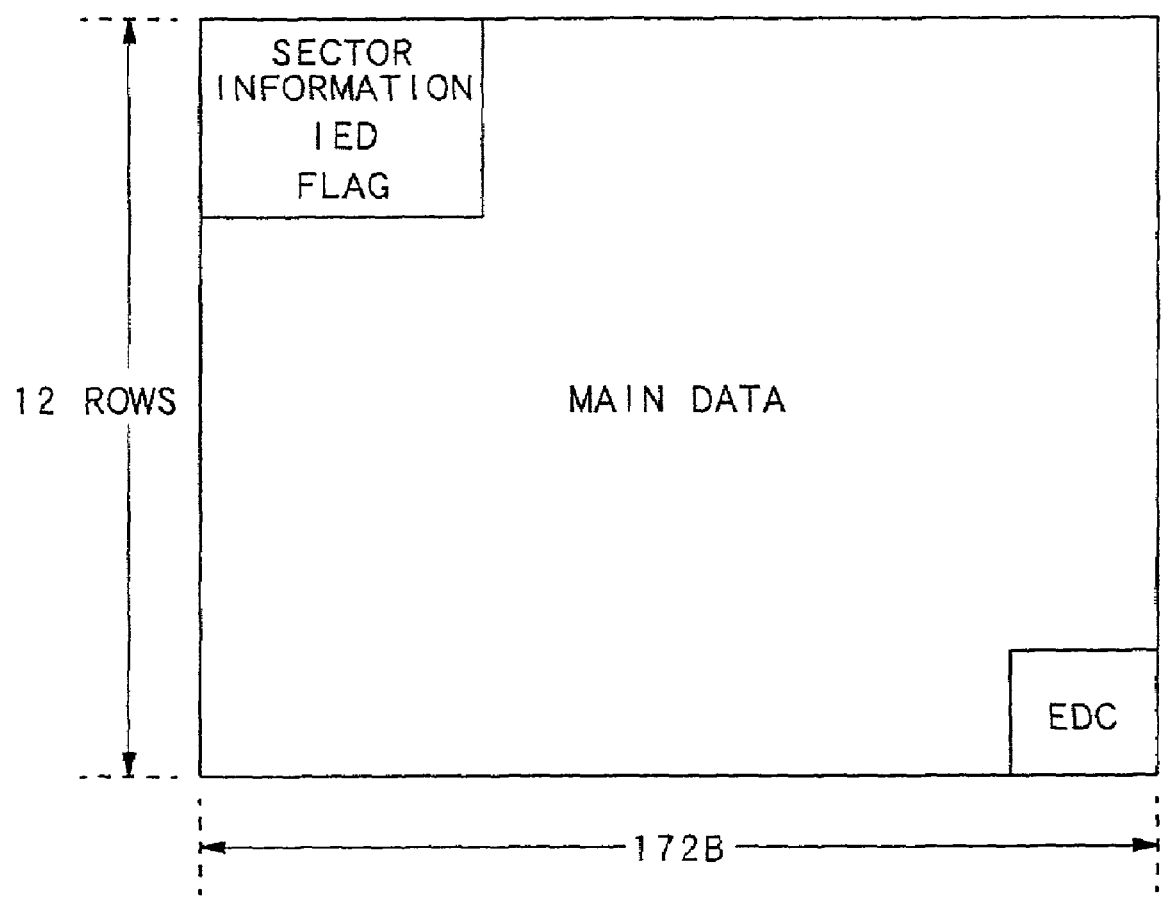
FIG. 6 is a diagram showing the sector format of a DVD.

Referring now to FIG. 6, a sector, which is a basic data unit of a DVD, consists of an array of 172 bytes by 12 rows. Recorded at the head of the sector are: sector information including a sector number, an area type, a data type, and a layer number; a parity IED for detecting sector number error; and a flag reserved in the sector. The lead out area is located by referring to the area type. At the tail of the sector which follows the main data, a parity EDC for detecting error throughout the sector is appended.

It is specified that zeroes are to be written as main data in sectors belonging to the lead out area. However, in this embodiment in which the correction data is to be recorded in the lead out area, a data pattern corresponding to the correction data is written, instead of zeroes, in such sectors. There will be no trouble recording the correction data in the lead out area because the data written in the lead out area would never be referred to for any other purpose than for reading the correction data. It should be noted that the correction data written in the sectors belonging to the lead out area is identified by appending a predetermined header at the head of the lead out area, or, alternatively, the reserved flag mentioned above may be used for the same purpose.

In another embodiment, the correction data may be recorded in a predetermined location in the outer region of the lead out area. In this embodiment, a flag indicative of the correction data recording area needs to be appended, so that the correction data recording area can be located by referring to that flag.

As mentioned above, the correction data may be recorded in the lead out area or its outer region on the disk 10 no matter how the lead out area is arranged, variable or fixed.

A modification of the above embodiment will be described as a case where the invention is applied to an information recording/reproducing apparatus. Specifically, an optical disk recorder as the information recording/reproducing apparatus performs recording on a recordable disk 10. In this case, correction data for correcting a recording/playing program executed by the optical disk recorder are recorded on the disk 10. A basic flow of correcting process steps performed by the optical disk recorder is generally common to that performed by the optical disk player described above. As to the recordable disk 10, due to its being a blank disk, correction data to be recorded is relevant to trouble associated with the recording/playing program inherent in the optical disk recorder, not relevant to trouble associated with a particular content object.

Various physical configurations may be conceivable to record such correction data on the recordable disk 10. For example, in one configuration, each of recording tracks alternates with each of wobbling guide tracks in the radial direction, to record user data on the recording tracks and extract a rotation reference signal from the guide tracks. In this configuration, the correction data is modulated along the guide tracks during the formation of the guide tracks, so that the correction data can be extracted during playback. This configuration prevents any willful third party from tampering the correction data on the disk 10.

It should be noted that if the recordable disk 10 is a DVD, the optical disk recorder uses a push-pull method for tracking, so that the correction data is extracted from push-pull signals. That is, the correction data on the recordable disk 10 can be read by a method different from a DPD method typically used by a DVD optical disk player, and hence enhanced security can be provided.

For a DVD-based disk 10 in which information pits are formed in grooved tracks, correction data pits may be formed on land tracks to be read by the push-pull method. In this case also, the correction data can be read by the method different from typical reading methods used by optical disk players.

The following describes the case where the correction data is recorded in the lead out area or its outer region on the disk 10 in advance in an application of the invention to the optical disk recorder. In the recordable disk 10, a lead out area is defined when content data is recorded, and thus no lead out area has not yet been provided in an unrecorded disk 10. To record correction data on a disk in advance as mentioned above, one must keep in mind the following points.

That is, the correction data recording area may be set at a predetermined location in an area outward of the outermost location of the user data area, or a minimally required lead out area may be set at a predetermined location in an area outward of the outermost location of the user data area. The recording of the correction data should start at the tail of content data recorded in the user data area, by which the lead out area can be defined with its start position defined. Since the location (address) of the correction data recording area or the lead out area is identifiable beforehand as mentioned above, the optical disk recorder does not need to specify the address every time it reads and records the correction data to correct its playing program.

As described in the foregoing, according to the invention, the information reproducing apparatus reads correction data recorded in the lead out area or its outer region and corrects the reproducing program using the read correction data, when reproducing an information recording medium. Thus, upon occurrence of trouble in the reproducing program for reproducing the information recording medium, the reproducing program can be corrected quickly and properly based on a plurality of types of correction data corresponding to different reproducing programs compatible with different models, etc. of information reproducing apparatuses.

The entire disclosure of Japanese Patent Application No. 2001-180695 filed on Jun. 14, 2001 including the specification, claims, drawings and summary is incorporated herein by reference in its entirety.

What is claimed is:

1. An information reproducing apparatus that corrects a reproducing program using correction data recorded on an information recording medium to reproduce record information recorded on the information recording medium, the apparatus comprising:
   a correction control device for reading the correction data to be used to correct the reproducing program, from the information recording medium on which the correction data is recorded in a lead out area, to correct the reproducing program based on the read correction data; and
   a reproduction control device for reproducing the record information recorded on the information recording medium according to a latest version of the reproducing program which is corrected by the correction control device,
   wherein the information reproducing apparatus further comprises a nonvolatile storage device for storing the correction data, wherein the correction control device records the correction data in a predetermined location of the storage device, and the reproduction control device executes a corrected version of the reproducing program after confirmation that the correction data is recorded normally.

2. The information reproducing apparatus according to claim 1, wherein the correction control device records a start position of the correction data as a start position address, and
   the reproduction control device executes the corrected version of the reproducing program by searching the start position address.

3. The information reproducing apparatus according to claim 1, wherein while the correction data is recorded in the storage device, an operation of turning off power is prohibited.

4. The information reproducing apparatus according to claim 1, wherein the correction data comprises difference data between an original version of the reproducing program and a corrected version of the reproducing program, and
   the correction control device corrects the reproducing program based on the original version of the reproducing program and the difference data.

5. An information reproducing apparatus that corrects a reproducing program using correction data recorded on an information recording medium to reproduce record information recorded on the information recording medium, the apparatus comprising:
   a correction control device for reading the correction data to be used to correct the reproducing program, from the information recording medium on which the correction data is recorded in an area radially outward of a lead out area, to correct the reproducing program based on the read correction data; and
   a reproduction control device for reproducing the record information recorded on the information recording medium according to a latest version of the reproducing program which is corrected by the correction control device,
   wherein the information reproducing apparatus further comprises a nonvolatile storage device for storing the correction data, wherein the correction control device records the correction data in a predetermined location of the storage device, and the reproduction control device executes a corrected version of the reproducing program after confirmation that the correction data is recorded normally.

6. The information reproducing apparatus according to claim 5, wherein the correction control device records a start position of the correction data as a start position address, and
   the reproduction control device executes the corrected version of the reproducing program by searching the start position address.

7. The information reproducing apparatus according to claim 5, wherein while the correction data is recorded in the storage device, an operation of turning off power is prohibited.

8. The information reproducing apparatus according to claim 5, wherein the correction data comprises difference data between an original version of the reproducing program and a corrected version of the reproducing program, and the correction control device corrects the reproducing program based on the original version of the reproducing program and the difference data.

9. A method of correcting a reproducing program using correction data recorded on an information recording medium, the method comprising:

the process of reading the correction data to be used to correct the reproducing program, from the information recording medium on which the correction data is recorded in a lead out area; and the process of correcting the reproducing program based on the read correction data, wherein the method of correcting a reproducing program further comprises: the process of recording the correction data at a predetermined position of a nonvolatile storage device; and the process of recording a start position of the recorded correction data as a start position address which is used by the process of reading to search for the corrected data.

10. The method of correcting a reproducing program according to claim 9, wherein the correction data comprises difference data between an original version of the reproducing program and a corrected version of the reproducing program, and the reproducing program is corrected based on the original version of the reproducing program and the difference data.

11. A method of correcting a reproducing program using correction data recorded on an information recording medium, the method comprising:

the process of reading correction data to be used to correct the reproducing program, from the information recording medium on which the correction data is recorded in an area radially outward of a lead out area; and the process of correcting the reproducing program based on the read correction data, wherein the method of correcting a reproducing program further comprises: the process of recording the correction data at a predetermined position of a nonvolatile storage device; and the process of recording a start position of the recorded correction data as a start position address which is used by the process of reading to search for the corrected data.

12. The method of correcting a reproducing program according to claim 11, wherein the correction data comprises difference data between an original version of the reproducing program and a corrected version of the reproducing program, and the reproducing program is corrected based on the original version of the reproducing program and the difference data.

13. An information recording medium on which recorded information as well as correction data for correcting a reproducing program executed by an information reproducing apparatus are recorded, wherein the correction data is recorded in a lead out area, wherein the correction data each comprises difference data between an original version of the reproducing program and a corrected version of the reproducing program.

14. The information recording medium according to claim 13, wherein the correction data is recorded in a recording format different from a recording format in which the recorded information is recorded.

15. An information recording medium on which recorded information as well as correction data for correcting a reproducing program executed by an information reproducing apparatus are recorded, wherein the correction data is recorded in an area radially outward of a lead out area, wherein the correction data each comprises difference data between an original version of the reproducing program and a corrected version of the reproducing program.

16. The information recording medium according to claim 15, wherein the correction data is recorded in a recording format different from a recording format in which the recorded information is recorded.

* * * * *